J. D. FANGER.
BEET TOPPING MECHANISM.
APPLICATION FILED APR. 5, 1917. RENEWED JAN. 4, 1918.

1,273,756.

Patented July 23, 1918.
3 SHEETS—SHEET 1.

Witness
H. Woodard

Inventor
J. D. FANGER
By H. B. Willson & Co.
Attorneys

J. D. FANGER.
BEET TOPPING MECHANISM.
APPLICATION FILED APR. 5, 1917. RENEWED JAN. 4, 1918.
1,273,756.
Patented July 23, 1918.
3 SHEETS—SHEET 2.
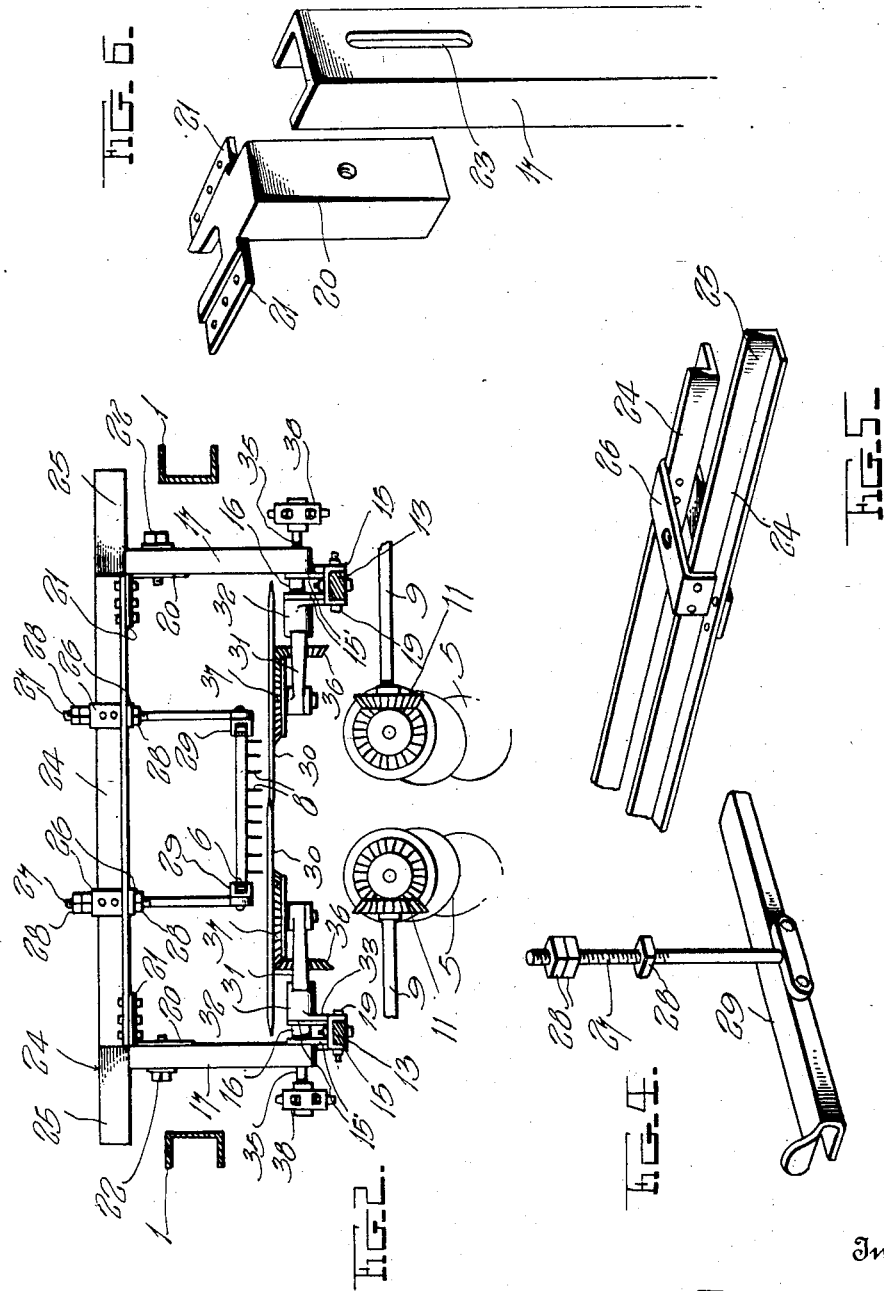
Witness
H. Woodard
Inventor
J. D. Fanger
By H. B. Willson & Co.
Attorneys

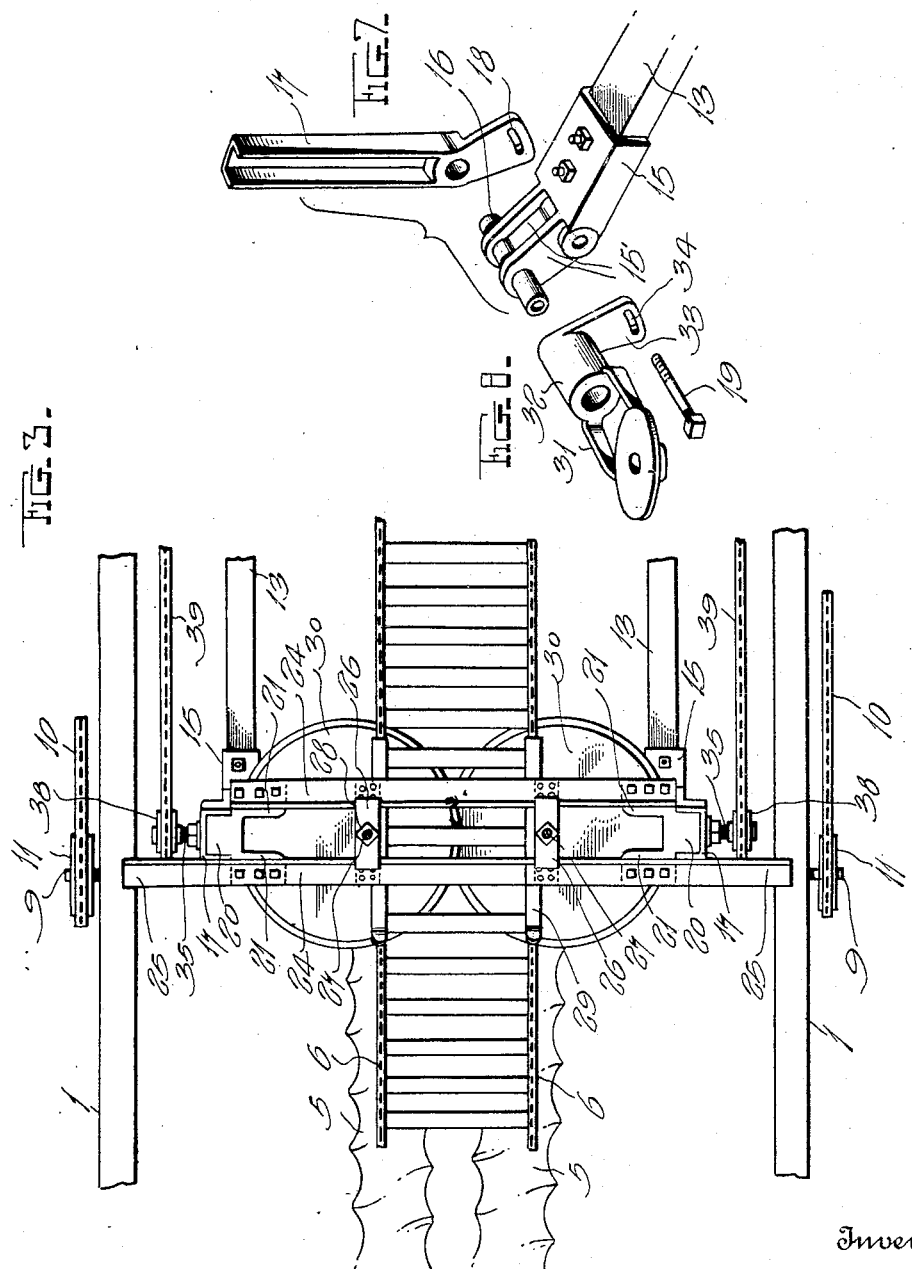

UNITED STATES PATENT OFFICE.

JOSEPH D. FANGER, OF TOLEDO, OHIO, ASSIGNOR TO THE FANGER BEET HARVESTER CO., OF TOLEDO, OHIO, A CORPORATION OF OHIO.

BEET-TOPPING MECHANISM.

1,273,756.      Specification of Letters Patent.      Patented July 23, 1918.

Application filed April 5, 1917, Serial No. 159,914. Renewed January 4, 1918. Serial No. 210,405.

*To all whom it may concern:*

Be it known that I, JOSEPH D. FANGER, a citizen of the United States, residing at Toledo, in the county of Lucas and State of Ohio, have invented certain new and useful Improvements in Beet-Topping Mechanisms; and I do declare the following to be a full, clear, and exact description of the invention, such as will enable others skilled in the art to which it appertains to make and use the same.

My invention relates to topping mechanisms for that class of beet harvesting machines including an endless chain coöperating with other parts for moving the beets rearwardly and at the same time holding them in substantially vertical positions.

The principal object is to provide a topping mechanism constructed and mounted in a simple and inexpensive yet efficient manner and maintained in proper relation with the chain by means of guides through which the latter passes. With this general object in view, the invention resides in certain novel features of construction and unique combinations of parts to be hereinafter fully described and claimed, the descriptive matter being supplemented by the accompanying drawings which constitute a part of this application and in which:

Fig. 2 is a vertical transverse section on the plane of the line 2—2 of Fig. 1;

Fig. 3 is a horizontal section on the plane indicated by the line 3—3 of Fig. 1;

Fig. 4 is a perspective view of one of the chain guides and the arm rising therefrom;

Fig. 5 is a perspective view of one end of the frame member supported by said arm;

Fig. 6 is a perspective view of the arm which depends from said end of the frame and the bracket by means of which said arm is attached;

Fig. 7 is a perspective view showing one of the bearings to which the radius rods are connected and illustrating the relation of the last named arm to this bearing;

Fig. 8 is a perspective view of one of the cutter supporting brackets which are mounted adjustably on the inner ends of said bearings.

Figure 1:
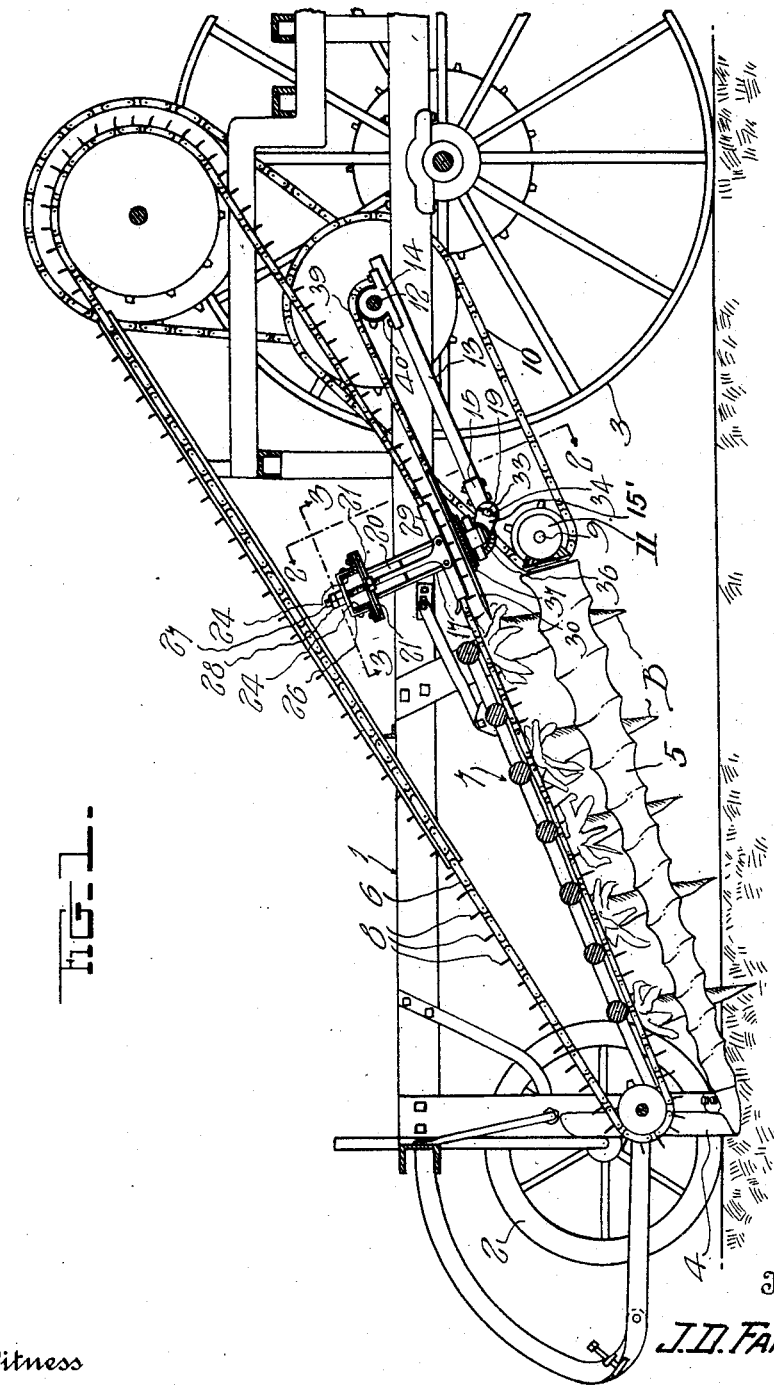
Figure 1 is a longitudinal section of a beet harvesting machine showing the application of the invention thereto.

In the drawings above briefly described, the numeral 1 has reference to the horizontal frame of a beet harvesting machine, said frame being supported by front and rear wheels 2 and 3. Earth slitting knives 4 depend from the front end of the frame 1 and rotatably support the lower ends of augers 5 which remove the beets B from the earth and coöperate with an endless belt or chain 6 in carrying the same upwardly and rearwardly while holding them in substantially vertical positions. The construction and mounting of the chain 6 forms no part of the invention covered by the present application and the details thereof need not therefor be described. It may be explained, however, that a weighted chain 7 rests on the lower rearwardly moving reach of the chain 6 to insure proper engagement of the prongs 8 thereof with the beets. This weighted chain 7 constitutes the subject matter of another application and is not a feature of my invention.

The augers 5 are by preference driven by transverse shafts 9 which are in turn rotated by means of sprocket chains 10 and sprockets 11 from a transverse shaft 12 mounted on the rear end of the frame 1 and driven by any preferred means but preferably by a gasolene or oil motor not shown. A pair of radius rods 13 extend forwardly from the shaft 12 and are provided with bearings 14 through which said shaft passes, whereby said rods are mounted for vertical oscillation, the front ends of said rods being secured in the channel-shaped rear ends 15 of the attaching arms 15' of a pair of transverse elongated bearings 16. The outer ends of the bearings 16 project beyond the arms 15 and are received in openings near the lower ends of vertical arms 17, which latter are preferably of channel-shaped formation and are provided in their lower ends with arcuate slots 18 concentric with said openings. Bolts 19 pass through the slots 18 and the arms 15 to hold the arms 17 in adjusted position, the latter being free for arcuate adjustment forwardly and rearwardly when said bolts are loosened.

The upper ends of the arms 17 project a suitable distance above the lower reach of the chain 6 and receive in their channels a pair of vertically elongated blocks 20 with which a pair of brackets 21 are equipped, bolts 22 being passed through said blocks and through vertical slots 23 in said arms so that the brackets may be adjusted vertically and held in adjusted position. The brackets 21 form the ends of a frame member which is completed by a pair of transversely extending bars 24 secured at their ends thereto and positioned between the two reaches of the chain 6, the ends of one of the bars 24 projecting a suitable distance to overlie the side bars of the frame 1 to form stops 25 which limit the downward movement of the frame member in question, and the parts associated therewith. Cross plates 26 are secured at their ends to the bars 24 and vertical rods or arms 27 pass through openings in said cross plates and are held adjustably therein by nuts 28 above and below said plates, the lower ends of said rods being secured to guides 29 through which the edges of the lower reach of chain 6 pass. The guides 29 are by preference of the channel shape shown although other constructions could well be used.

It will be observed that the lower reach of the chain 6 will be automatically moved to different elevations by the beets B, according to the size of the latter and since the guides 29 receive the edges of the chain, they will be correspondingly moved to maintain the topping means now to be described in proper relation with the beets.

The topping means referred to, by preference, consist of a pair of rotating disks 30 which will in most cases overlap at their inner edges, said disks being supported by brackets 31 having rocker bearings 32 mounted on the inner ends of the bearings 16, said bearings having laterally extending wings 33 provided with arcuate slots 34 through which the bolts 19 pass, whereby loosening of these bolts will not only permit adjustment of the arms 17 but will allow similar movement of the brackets 31 to position the cutters 30 at any required angle.

Short transverse shafts 35 pass rotatably through the bearings 16 and at their inner ends are equipped with beveled pinions 36 meshing with beveled gears 37 secured to the under sides of the cutters 30, suitable housings being preferably provided around said gears and pinions to exclude dirt and dust therefrom and to retain grease for lubricating these and adjacent parts. These housings, however, are omitted for the sake of clearness. The outer ends of the shafts 35 are shown equipped with sprockets 38, around which sprocket chains 39 pass, said chains being driven from other sprockets 40 on the shaft 12 around which the radius rods 13 pivot. It will thus be observed that regardless of the amount of movement of said rods and the cutting mechanism at the front ends thereof, said mechanism will be constantly driven.

In operation, the machine is propelled or drawn over the field, according to its construction, and the knives 4 then slit the earth on both sides of the rows of beets. The augers 5 and chain 6 now coöperate in removing the beets from the earth and conveying them rearwardly and when said beets are brought between the cutters 30, the tops thereof will be severed. After this takes place, the beets and tops may be handled by any preferred means which forms no part of the present application and is therefore eliminated. The beets will not project a strictly uniform distance above the augers but the chain 6 is maintained in engagement with the upper ends of said beets by the weighted chain 7 and regardless of the elevation of said chain 6, the guides 29 will insure that the cutting mechanism be properly positioned for severing the beet top and only a predetermined amount of the beet proper.

From the foregoing, taken in connection with the accompanying drawings, it will be seen that although the invention is of comparatively simple and inexpensive nature, it will be highly efficient and durable. Since the results described are best obtained by the specific construction shown, this construction constitutes the preferred form of the machine. It is to be understood, however, that within the scope of the invention as claimed, numerous changes could well be made without sacrificing the principal advantages. For instance, a straight rigid knife could in some cases be employed in lieu of the cutters 30 but such a knife is not as efficient and rotary cutters are therefore preferably employed.

I claim:

1. The combination with a beet harvesting machine having means including an endless belt for conveying the beets rearwardly in substantially a vertical position, of guides through which the edges of said belt pass, a beet topping mechanism movable bodily with said guides, and a pair of vertically swinging radius rods extending from said mechanism and mounted pivotally.

2. The combination with a beet harvesting machine having means including an endless belt for conveying the beets rearwardly in substantially a vertical position, of guides through which the edges of said belt pass, a frame member supported by said guides and disposed above the lower reach of said belt, arms depending from the ends of said frame member, a beet topping mechanism supported by said arms, and a pair of radius rods extending from said mechanism and mounted pivotally.

3. The combination with a beet harvesting machine having means including an endless belt for conveying the beets rearwardly in substantially a vertical position, of guides through which the edges of said belt pass, arms rising from said guides, a frame member supported by the upper ends of said arms and disposed above the lower reach of said belt, other arms depending from the ends of said frame member, a beet topping mechanism supported by the lower ends of said last named arms, and a pair of radius rods extending from said mechanism and mounted pivotally.

4. A structure as specified in claim 2, said frame member having stops on its ends for limiting the downward movement of same.

5. The combination with a beet harvesting machine having means including an endless belt for conveying the beets rearwardly in substantially a vertical position, of guides through which the edges of said belt pass, a transverse frame member supported by said guides and disposed above the lower reach of said belt, arms depending from the ends of said frame member, transverse bearings supported by the lower ends of said arms, radius rods extending from said bearings and mounted pivotally, transverse driven shafts mounted in said bearings, and rotary cutters driven from said shafts and disposed below said lower reach of the belt.

6. The combination with a beet harvesting machine having means including an endless belt for conveying the beets rearwardly in substantially a vertical position, of guides through which the edges of said belt pass, a transverse frame member supported by said guides and disposed above the lower reach of said belt, arms depending from the ends of said frame member, transverse bearings to which the lower ends of said frame member are connected for arcuate adjustment forwardly and rearwardly, radius rods extending from said bearings and mounted pivotally, driven shafts mounted in said bearings, rotary cutters driven by said shafts, and brackets secured on said bearings for arcuate adjustment and supporting said cutters.

7. The combination with a beet harvesting machine having means including an endless belt for conveying the beets rearwardly in substantially a vertical position, of guides through which the edges of said belt pass, a transverse frame member supported by said guides and extending above the lower reach of said chain, arms depending from the ends of said frame member and having openings in their lower ends and arcuate slots concentric with said openings, transverse bearings received at their outer ends in said openings, radius rods extending from said bearings and mounted pivotally, cutter supporting brackets having rockers mounted on the inner ends of said bearings and having lateral wings formed with arcuate slots concentric with said bearings, means passing through the several arcuate slots for holding said arms and said brackets in adjusted position, transverse driven shafts mounted in said bearings, and rotary cutters mounted on said brackets and driven by said shafts.

In testimony whereof I have hereunto set my hand in the presence of two subscribing witnesses.

JOSEPH D. FANGER.

Witnesses:
HARRY LEVISON,
MARY SKEFFINGTON.

Copies of this patent may be obtained for five cents each, by addressing the "Commissioner of Patents, Washington, D. C."